Jan. 23, 1934.          G. E. VANCE          1,944,380
METHOD OF AND MEANS FOR BUSHING OPENINGS
Filed April 2, 1930     2 Sheets-Sheet 1
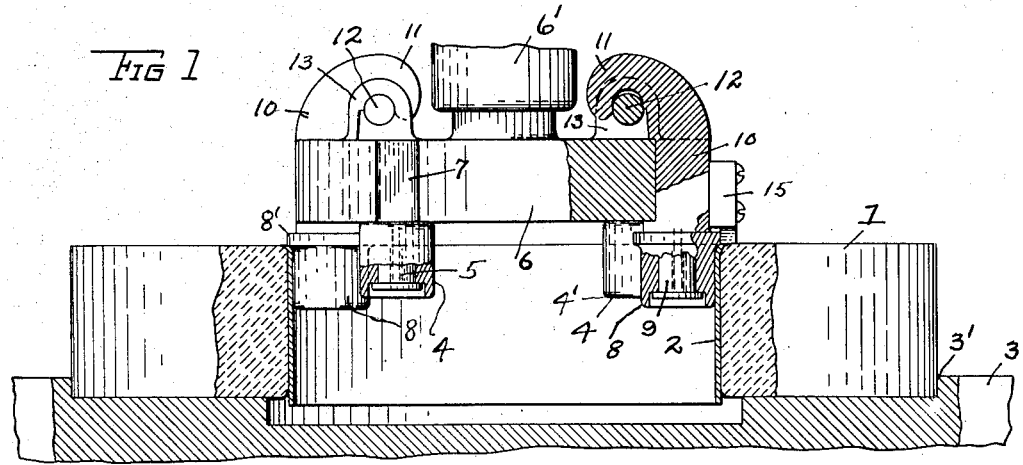
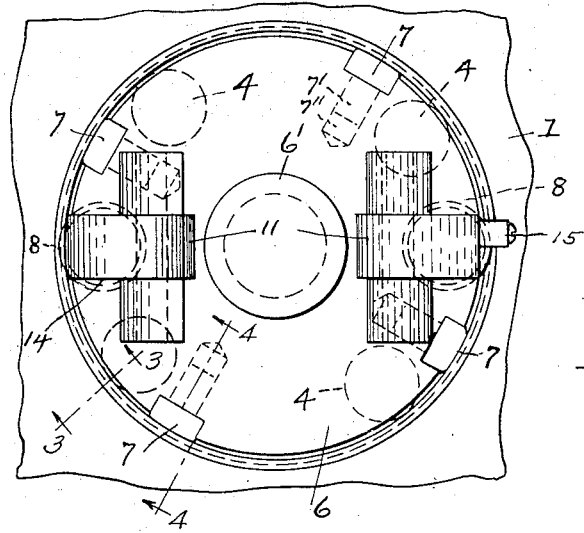
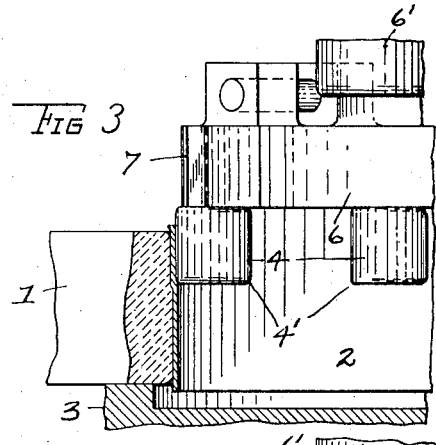
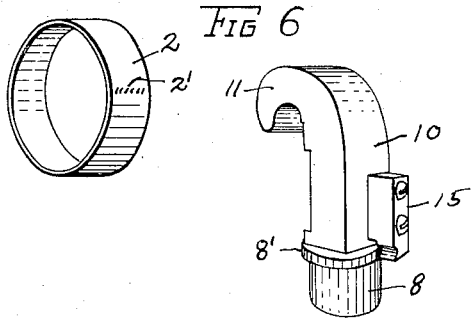
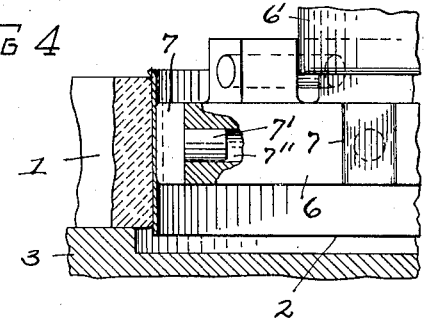
INVENTOR
George E. Vance
BY
Staley & [illegible]
ATTORNEYS Jan. 23, 1934.   G. E. VANCE   1,944,380
METHOD OF AND MEANS FOR BUSHING OPENINGS
Filed April 2, 1930   2 Sheets-Sheet 2
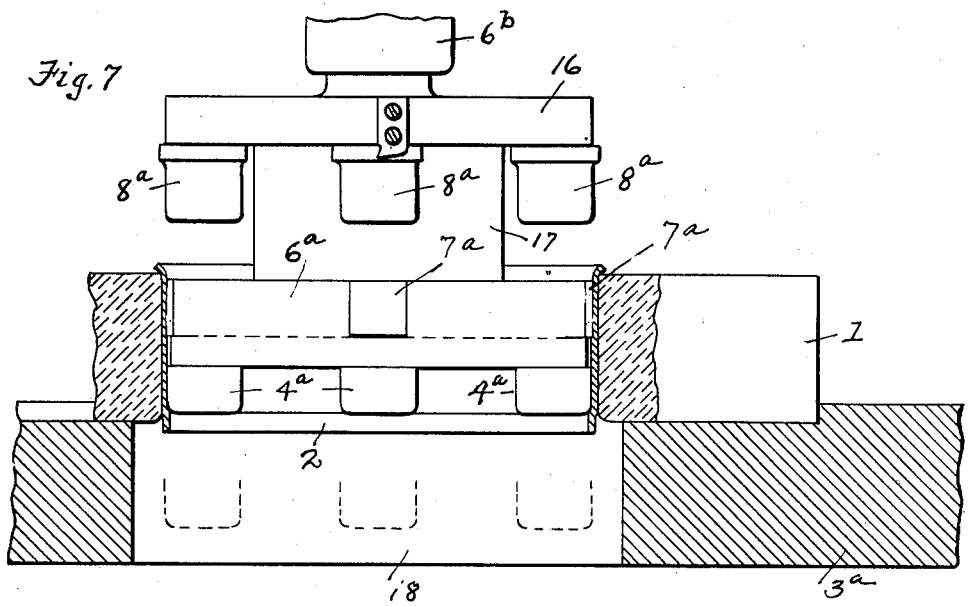
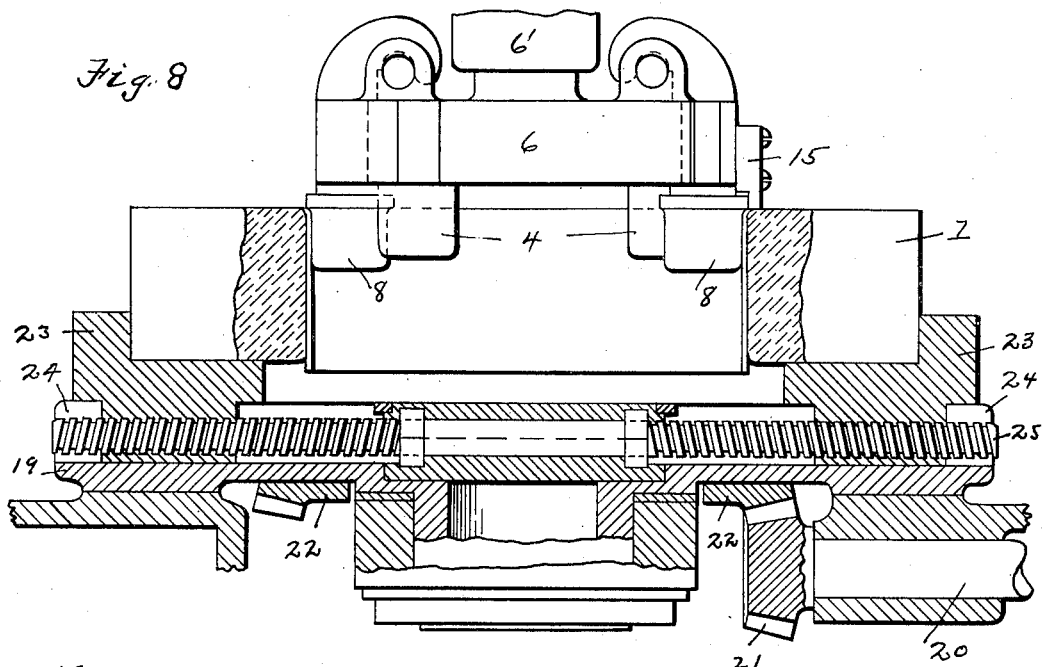
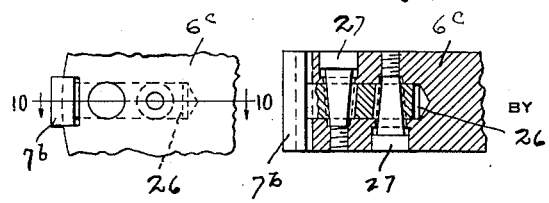
INVENTOR
George E. Vance
BY Staley & Welch
ATTORNEYS Patented Jan. 23, 1934

1,944,380

UNITED STATES PATENT OFFICE 1,944,380

METHOD OF AND MEANS FOR BUSHING OPENINGS

George E. Vance, Springfield, Ohio, assignor to The Safety Grinding Wheel & Machine Company, Springfield, Ohio, a corporation of Ohio Application April 2, 1930. Serial No. 441,116

6 Claims. (Cl. 29—33)

This invention relates to a method of and apparatus for applying bushings, such for instance as the bushings which are inserted in the spindle openings of grinding wheels; it more especially relating to a method and means whereby a preformed metallic bushing of yieldable character, such as one formed of lead, may be forced into intimate contact with the interstices of the material forming the wall of the opening, such as, for example, by stretching the bushing by a rolling and ironing action by suitable mechanical apparatus to cause the same to firmly adhere to the material forming the wall of the opening, but leaving the interior of the bushing with a smooth surface of uniform diameter throughout.

It has been customary in the manufacture of grinding wheels, regardless of size, to line or bush the central opening or spindle hole in the wheel with suitable material, such as lead, for the purpose of preventing abrasion of the spindle or adapter collar when the wheel is being applied thereto or removed therefrom, or by slippage in operation. The universal custom heretofore has been to form the bushing by pouring melted lead into the opening of the wheel around a mandrel which is centrally positioned in the opening.

There are several disadvantages inherent to this method of applying a bushing, one of which is that in pouring molten material in the larger sized holes to form a bushing having a certain desired internal diameter, the opening provided in the wheel must be in the neighborhood of ¼ to ½ inch larger in diameter than the mandrel in order to permit the metal to run freely into the space and to prevent chilling thereof, so that a bushing thus applied must be comparatively thick.

One of the objects of my invention is to provide a method of applying a comparatively thin bushing to the wheel opening whereby the opening in the wheel before the application of the bushing may be made correspondingly smaller to thereby increase the strength of the wheel and its resistance to bursting; it being understood that the strength of the wheel or its resistance to bursting depends on the bond, or in other words, the radial distance from the opening to the periphery of the wheel. This enables a wheel to be used to a longer extent before being discarded due to wear reducing the distance from the opening to the periphery to a point beyond which the operation of the wheel is not considered safe.

Another object of the invention is to provide a bushing which will result in economy in the use of the metal, such as lead, which forms the bushing.

A further object of my invention is to provide a bushing which will have a greater density than one of the cast type whereby the bushing will retain its original concentricity and size and prevent distortion thereof due to shock from rough usage.

Other objects of my invention will appear from the accompanying description and statement of advantages.

In the accompanying drawings:

Fig. 1 is a view partly in side elevation and partly in vertical section of a grinding wheel and apparatus for applying a bushing thereto.

Fig. 2 is a top plan view of the same.

Fig. 3 is a section on the line 3—3 of Fig. 2, showing one step of the method.

Fig. 4 is a section on the line 4—4 of Fig. 2 showing another step of the method.

Fig. 5 is a perspective view of the bushing before application thereof to the wheel opening, the view being on a reduced scale from that shown in the preceding figures.

Fig. 6 is an enlarged perspective view of one of the flanging rollers and its support, together with the flange truing knife.

Fig. 7 is a view partly in side elevation and partly in vertical section of a modified form of apparatus for carrying out the invention.

Fig. 8 is a view of another modification in the apparatus partly in side elevation and partly in section.

Fig. 9 is a plan view of a portion of the support for the tools and one of the ironing tools, showing means for adjusting the tool.

Fig. 10 is a section on the line 10—10 of Fig. 9.

Referring first to Figs. 1 to 6 inclusive, there is illustrated one form of apparatus for carrying out my improved method. The wheel to which the bushing is to be applied is indicated at 1 and the bushing at 2. The bushing is first preformed to the extent that a strip of metal such as lead is made in the form of a sleeve with adjacent edges soldered together as indicated at 2' in Fig. 5, the bushing thus formed being somewhat longer than the opening in the wheel to permit the ends thereof to be flanged over the sides of the wheel at the ends of the openings in the manner to be described. The bushing is then placed in the opening in the wheel which is supported in a recess 3' in a suitable supporting table 3, the diameter of the sleeve being such as to afford a snug fit in the wheel opening and one end of the bushing being slightly outturned to retain it in proper position. The next operation is to stretch the metal of the bushing to cause it to enter the interstices of the wall of the wheel opening, and to that end there is provided a plurality of rolls 4 each of which is journalled upon a stud 5 which depends from the under side of a rotatable disk 6; these studs being shown in the present case as four in number equally spaced apart to accommodate four rollers and to so position the rollers that a circle encompassing and tangent to the peripheries of the rollers is preferably slightly less than the inner circumference of the finished bore. In this form of the apparatus the disk 6 has a shank 6' which is connected with the rotatable vertically-movable spindle of a drill press, and the table 3 is the usual table of the press. After the bushing has been positioned in the wheel opening the disk 6 is depressed to position the rollers 4 in one end of the bushing with the disk rotating, and these rollers, engaging the inner periphery of the bushing, act to stretch and press the same into intimate contact with the walls of the wheel. The lower edges of these rolls 4 are rounded as indicated at 4' to permit them to enter the bushing and engage the inner surface of the same in an efficient manner and prevent tearing of the metal of the bushing. By the complete passage of the rolls through the bushing a comparatively smooth round bore is produced and the metal rendered dense and hard.

Following the operation of the rolls 4, the sizing and accurate finishing of the bore is effected, which operation enlarges the bore a few thousandths part of an inch to the desired size. This is accomplished by ironing shoes 7, these shoes being of hardened steel accurately ground and set. In this form of the device the shoes are removably connected with the disk by providing each shoe with a round stem 7' which is inserted in a round recess or opening 7'' in the disk. Four of these shoes are shown in the present case, the outer faces of which are formed on arcs of circles having a common center at the axis of the supporting disk, and a circle encompassing the outer surfaces of these shoes is preferably slightly greater than the circle which encompasses the rolls 4. By the action of these shoes the inner surface of the bushing is ironed to a smooth and accurate finish to provide an accurate sized bore of predetermined size.

The next operation is to flange the ends of the bushing and true the edges of the flanges. This is performed by flanging the rolls 8 which are removably attached to the supporting disk 6 so that the flanging rolls may be applied thereto after the initial stretching, pressing and ironing operations. The upper end of each of these rolls has a flange 8' and the roll is journalled upon a stud 9 on the lower end of a bracket 10 which has a hook-shaped portion 11 which is hung on a rod 12 fixed in ears 13 on the upper side of the supporting disk 6, each of the brackets 10 lying in a slot 14 cut axially in the outer periphery of the disk 6. These flanging rollers are positioned to accurately fit the finished bore of the bushing and act to flange or swage over the projecting end of the bushing as shown in Fig. 1. A cutting tool 15 is secured to the outer side of the end of one of the bracket members 10 and acts to trim the edge of the flange as the disk 6 rotates. After one end of the bushing has been flanged the wheel is reversed and the other end of the bushing flanged.

In this form of the device the initial stretching and pressing rolls 4 may be permanently attached to the supporting disk 6, but the shoes 7 and flanging rolls 8 are detachable so that in the initial stretching and pressing of the bushing the shoes and flanging rollers will be absent. The shoes are then inserted and the ironing operation performed, and thereafter the flanging rollers applied to perform their operation.

In Fig. 7 there is shown a modified form of the invention in which the initial stretching and pressing rolls, the ironing shoes and the flanging rolls may be all permanently applied to the support. This tool is also a rotating tool having a shank $6^b$ which is connected with the drill press spindle. Initial stretching and pressing rolls, indicated at $4^a$ and ironing shoes, represented by $7^a$, are fastened to a disk $6^a$ in a manner similar to that previously described. The flanging rolls, indicated at $8^a$, are mounted upon an upper head or disk 16 which is shown as integrally connected with the disk $6^a$ by an intermediate portion 17. In the operation of this form of the apparatus the stretching and pressing rolls and the ironing shoes operate throughout the entire length of the bushing by a single operation, the table $3^a$ being provided with an opening 18 to accommodate these parts when the flanging rolls come into operation. To flange the other end of the sleeve, however, the wheel is reversed upon the table and the operation repeated.

In Fig. 8 a further modification is shown by which the tools are stationary and the wheel revolves, the tools in this case being shown mounted and arranged as in Figs. 1 to 6 inclusive excepting that the supporting head or disk is stationarily supported. A table is shown at 19 which may be a table similar to that employed in a machine known as a vertical boring mill, although this forming of apparatus is equally well adapted to use in an engine lathe. The table is rotated through gearing from a source of power (not shown), there being a shaft 20 having fast thereto a beveled pinion 21 which meshes with a beveled ring gear 22 fixed to the under side of the table. The wheel is gripped by a pair of simultaneously movable chuck jaws 23 sliding in ways 24 in the table and actuated by a screw 25 having right and left threads. Under certain conditions this is a preferable apparatus to carry out the method, more particularly in bushing those wheels in which the bore is relatively large as compared to the diameter of the wheel, to prevent the bursting of the wheel during the rolling, pressing and ironing process.

Another modification in the manner of securing the ironing shoes to their support is shown in Figs. 9 and 10 by which the shoes may be adjusted radially. In this modification the shoe, indicated at $7^b$, is provided with an extended cylindrical shank 26 which is inserted and retained in a prepared radial bore in the support $6^c$. Through the shank 26 and parallel to the axis of the tool support, are provided two openings tapered in reverse relation to one another. Tapered threaded screws 27 are fitted in openings in the support and pass through the shank. Adjustment is secured by backing out one screw and turning in the other.

Having thus described my invention, I claim:

1. The method of bushing an opening consisting of inserting in the opening a sleeve of soft metal of suitable size to encase the wall of the opening with its ends projecting beyond the ends of the opening, stretching and pressing the metal into intimate contact with the wall of the opening, and thereafter flanging the ends of the sleeve against the ends of the opening and then trimming the edges of the flanges.

2. In an apparatus for bushing an opening with a sleeve of soft metal insertable within the opening, a plurality of rolls insertable within the opening and engageable with the sleeve, the rolls and sleeve being capable of a relative movement both circumferentially and lengthwise of the opening to cause the rolls to stretch and press the metal of the sleeve into intimate contact with the walls of the opening, and a plurality of ironing devices, said ironing devices and sleeve being capable of a relative movement both circumferentially and lengthwise of said opening to iron the bore of the sleeve to symmetrical form.

3. In an apparatus for bushing an opening with a sleeve of soft metal insertable loosely in the opening with its ends projecting beyond the ends of the opening, means for stretching and pressing the metal into intimate contact with the walls of the opening, and a flanging roll for outturning the ends of the sleeve against the walls of the opening at the ends thereof the sleeve and the flanging roll being capable of a relative rotation, and a knife, the knife and the sleeve being capable of a relative rotation, to trim the edges of the flanges formed by the flanging roll.

4. In an apparatus for bushing an opening with metal insertable loosely within the opening in the form of a sleeve, a rotatable support movable lengthwise through the opening, a plurality of rolls rotatably mounted on said support and engageable with said sleeve to stretch and press the sleeve into intimate contact with the walls of the opening, and a plurality of shoes arranged to be mounted upon the support to also engage the sleeve after the operation of said rolls to iron the inner surface of the sleeve to symmetrical form.

5. In an apparatus for bushing an opening with metal insertable loosely within the opening in the form of a sleeve, a rotatable support movable lengthwise through the opening, a plurality of rolls rotatably mounted on said support and engageable with said sleeve to stretch and press the sleeve into intimate contact with the walls of the opening, and a plurality of shoes arranged to be mounted upon the support to also engage the sleeve after the operation of said rolls to iron the inner surface of the sleeve to symmetrical form, and a plurality of flanging rolls having flanges to flange the ends of the sleeve after the same has been acted upon by the said rolls and shoes.

6. In an apparatus for bushing an opening with metal insertable loosely within the opening in the form of a sleeve, a rotatable support movable lengthwise through the opening, a plurality of rolls rotatably mounted on said support and engageable with said sleeve to stretch and press the sleeve into intimate contact with the walls of the opening, a plurality of shoes arranged to be mounted on said support to iron the inner surface of the sleeve to symmetrical form, and a plurality of flanging rolls having flanges to flange the ends of the sleeve after the same has been acted upon by the said rolls and shoes, and a cutter to trim the edges of said flanges.

GEORGE E. VANCE.